United States Patent Office 3,661,753
Patented May 9, 1972

---

3,661,753
CARBON DIOXIDE REMOVAL DEVICE
John R. Aylward, Vernon, and James I. Smith, Enfield, Conn., assignors to United Aircraft Corporation, East Hartford, Conn.
Filed Nov. 18, 1970, Ser. No. 90,533
Int. Cl. C23b 5/68
U.S. Cl. 204—212                                      7 Claims

ABSTRACT OF THE DISCLOSURE

A device for selectively removing $CO_2$ directly from a breathable atmosphere under zero gravity conditions, said device including an anode and cathode with a fused electrolyte layer disposed therebetween. The electrolyte is arranged so as to be exposed, for a short time, to the atmosphere whereby the $CO_2$ is absorbed. Then the electrolyte is moved to a field between the anode and cathode whereby absorbed $CO_2$ is decomposed into carbon and oxygen.

BACKGROUND OF THE INVENTION

Field of the invention

The present invention relates to a device for selectively scrubbing carbon dioxide directly from a gaseous mixture and decomposing the carbon dioxide into carbon and oxygen, whereby the oxygen can be reused. The device has particular usefulness in a spacecraft where removal of carbon dioxide from the atmosphere is necessary and reuse of the oxygen is desirable.

Description of the prior art

Previously, equipment has been devised for scrubbing carbon dioxide from the atmosphere. Such equipment was not wholly satisfactory in that it did not effectively remove significant quantities of carbon dioxide, especially under the zero gravity conditions encountered on a spacecraft. Other types of equipment required auxiliary condensors to raise the concentration of $CO_2$ because low levels could not be removed by them.

According to the present invention, a fused electrolyte of lithium carbonate, lithium oxide and lithium chloride is heated to about 1100° F. and used to absorb carbon dioxide at low concentrations directly from a gaseous mixture. This carbon dioxide is then decomposed, in the equipment of the present invention, by electrolysis to produce solid carbon at a cathode and oxygen at an anode. The above-mentioned electrolyte is well known and described in an article by Shearer et al., Aerospace Medicine, February 1962, pp. 313–316 and U.S. Pat. 3,463,709 to Russell.

The equipment preferably utilized to effect this absorption and decomposition includes an anode, a cathode and an electrolyte. The cathode is in the shape of a circular turntable which rotates at low speeds, generally less than 100 r.p.m. It is disposed in a face-to-face relation with the anode which is stationary and that has an aperture formed therein for the introduction of gas and exposure of the electrolyte. The electrolyte is fused and is a thin layer held by capillary action between the cathode and the anode. The $CO_2$ laden-gas to be scrubbed contacts the electrolyte through the aperture and rotation transports the carbon dioxide which has been absorbed at the aperture to between the anode and cathode where it is decomposed into carbon and oxygen. Oxygen diffuses through the porous anode and carbon deposits upon the cathode. With this design, a small amount of electrolyte can be used to remove fairly large quantities of carbon dioxide. The electrolyte is regenerated and the oxygen can be recycled for reuse.

DESCRIPTION OF THE PREFERRED EMBODIMENT

Figure 1:
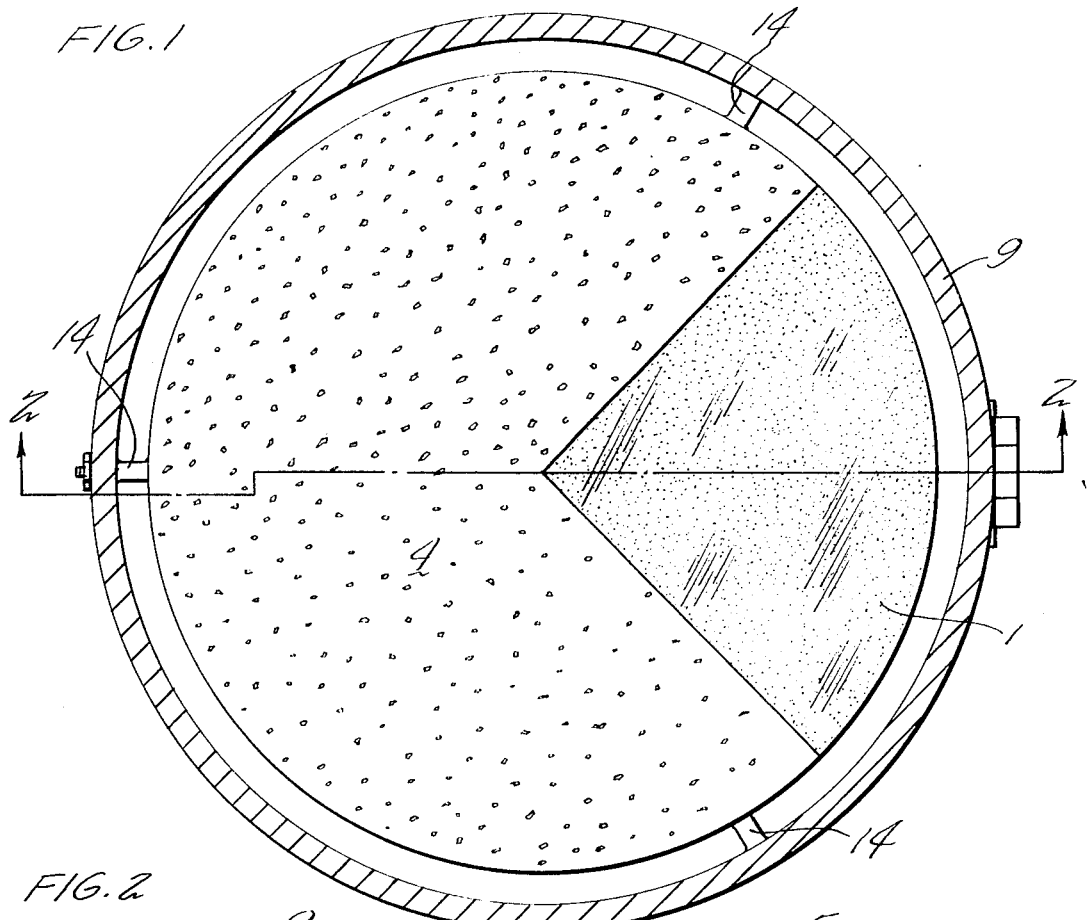
FIG. 1 is a top plan view of the equipment partially in cross section taken along the lines 1—1 of FIG. 2 and showing the anode and the electrolyte which is used for scrubbing the carbon dioxide.
Figure 2:
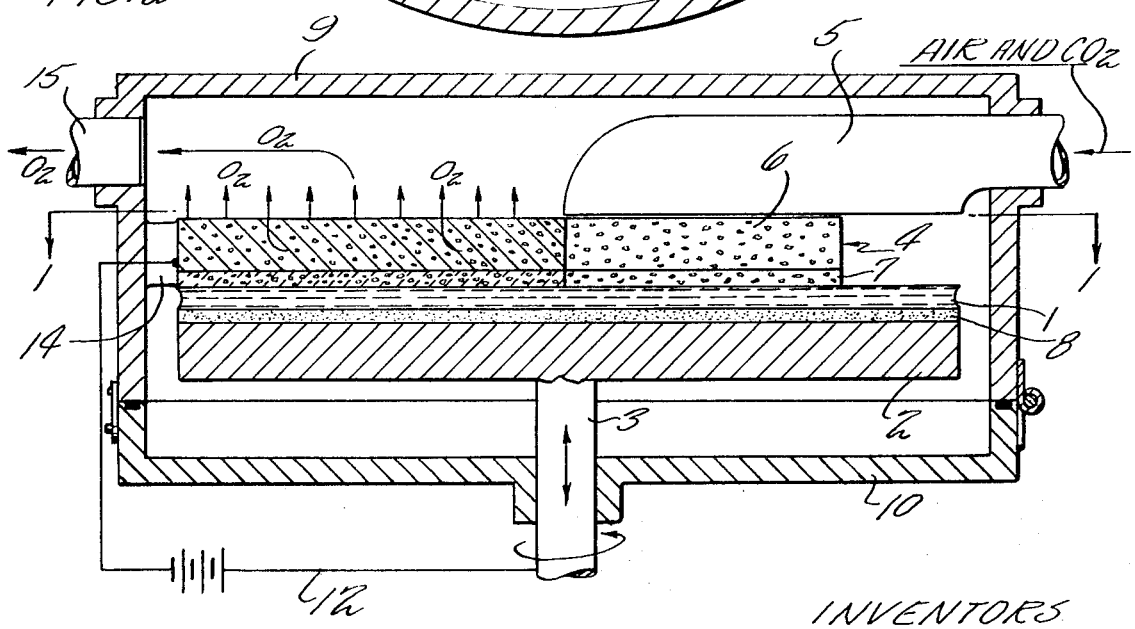
FIG. 2 is a cross-section view of the equipment taken along lines 2—2 of FIG. 1 showing the relative poistioning of the anode, cathode and electrolyte.

Referring to FIGS. 1 and 2, the layer of electrolyte of $Li_2CO_3$-$Li_2O$-$LiCl$ has the capacity to scrub low concentrations of $CO_2$ directly from air via the reaction $CO_2 + O^{2-} \rightarrow CO_3^{2-}$. The electrolyte is supported upon a cathode 2 which can be a circular, disposable disc in the shape of a turntable mounted upon a shaft 3 which rotates at low speeds with respect to a stationary anode 4 held by supports 14. To permit the $CO_2$ laden air to contact the electrolyte 1, anode 4 has an aperture (shown in FIG. 1) cut from it, preferably in a pie shape section. An inlet conduit 5, generally shaped to coincide with the shape of the aperture, provides a supply of $CO_2$ laden air. The oxygen that is produced through electrolysis of the $CO_2$ is vented through port 15.

Anode 4 is constructed in two layers. A conductive layer 6 is formed of a porous nickel sinter having a pore size between about 24 and $32\mu$ generally averaging about $28\mu$. An insulating nonconductive layer 7 is formed of porous ceramic, preferably alumina having a pore size between about 0.06 and $2.3\mu$, generally averaging about $0.7\mu$. Nonconductive layer 7 is bonded to the side facing the electrolyte. The thickness of the nonconductive layer 7 is chosen so that it does not have any appreciable effect upon the potential applied across the anode and cathode. During operation of the equipment, the carbon dioxide is decomposed at the cathode into carbon and oxide ions. The oxide ions are transported to the anode by diffusion and subsequently oxidized to oxygen gas which then passes through the pores of the anode and is discharged through port 15 in FIG. 2. Because the pore size of the conductive layer 6 of anode 4 is significantly larger than the pore size of the nonconductive layer 7 ($28\mu$ vs. $0.7\mu$), the oxygen bubbles which are formed on the surface of the porous nickel cannot reenter the electrolyte due to the difference in capillary forces. Since the electrolyte 1 between anode 4 and cathode 2 is also held in place by capillary forces, the device can operate in zero gravity.

Carbon is another product of the electrolysis and is deposited as a layer 8 upon the cathode 2. Since carbon is a solid, the thickness of the layer 8 increases as more carbon dioxide decomposes upon it. Electrolytic action requires a definite spacing between electrodes, however. To achieve this spacing, shaft 3 is gradually indexed downwardly at a rate corresponding to the rate of carbon deposition. When a predetermined thickness of carbon is deposited upon the cathode 2, it can be removed from the equipment, discarded and replaced with another.

In order to keep the electrolyte in a fused condition, the assembly described above is deposed within heated oven 9. The temperature is maintained (by means not shown) at a point where optimum absorption and electrolytic decomposition takes place, generally between 950° and 1300° F. The lower portion 10 of the oven 9 is operable by means of hinge 11 so that cathode 2 can be removed.

In operation, the $CO_2$ laden air is brought into the device after being passed through a heat exchanger and a regulator for moisture content (not shown). Since the impure air is scrubbed directly of $CO_2$, no major auxiliary equipment, such as a carbon dioxide concentrator, is needed. In operation, a gas mixture containing 1 percent of $CO_2$ was fed into the equipment. Current densities of 300 amps/ft.$^2$ were imposed through power source 12 at a voltage of 2 volts with 0.01 inch spacing between the anode and cathode. Removal of 65 percent of the $CO_2$ was obtained and the carbon deposited as a dense layer upon the cathode. Thus it can be seen that the present device provides a means to remove carbon dioxide from an atmosphere of air.

It is apparent that modifications and changes can be made by those skilled in the art. It is our intention, however, only to be limited by the scope of the appended claims.

What is claimed is:

1. An oxygen reclamation device capable of operating in zero gravity comprising: a cathode; means to rotate said cathode upon its axis; an anode in mutually facing relationship to said cathode defining a space therebetween adapted to retain a fused electrolyte layer, the anode comprising a foraminous conductive plate and a foraminous insulator bonded to the side facing said cathode; means to impose a potential between said anode and said cathode; and means forming an aperture in said anode to expose said electrolyte whereby gas containing carbon dioxide can contact said electrolyte and be absorbed therein.

2. The device according to claim 1 wherein said space is sufficiently small to retain said fused electrolyte layer by capillary action.

3. The device according to claim 1 further including means to maintain the anode at a predetermined distance from said cathode.

4. The device according to claim 1 wherein said conductive anode plate is porous nickel, the size of the pores in said plate being larger than the size of the pores in said anode insulator to provide gas-liquid separation in zero gravity.

5. The device according to claim 1 wherein said aperture is formed in a substantially wedge-shape.

6. The device according to claim 1 further including a housing and means to maintain said electrolyte at a predetermined temperature higher than the fusion point of said electrolyte.

7. The device according to claim 6 wherein the cathode is detachably disposed within said housing whereby it can be removed when a predetermined thickness of carbon is disposed thereon.

References Cited
UNITED STATES PATENTS

| | | | |
|---|---|---|---|
| 2,916,425 | 12/1959 | Fujioka et al. | 204—68 |
| 2,928,783 | 3/1960 | Bacon | 204—129 UX |
| 3,463,709 | 8/1969 | Russell | 204—60 |
| 3,265,490 | 8/1966 | Yoshizawa et al. | 204—68 |

JOHN H. MACK, Primary Examiner

W. I. SOLOMON, Assistant Examiner

U.S. Cl. X.R.

204—129, 243, 246

PO-1050
(5/69)

UNITED STATES PATENT OFFICE
CERTIFICATE OF CORRECTION

Patent No. 3,661,753     Dated May 9, 1972

Inventor(s) John R. Aylward, James I. Smith

It is certified that error appears in the above-identified patent and that said Letters Patent are hereby corrected as shown below:

Add the following paragraph to the specification:

-- The invention described herein was made in the performance of work under a NASA contract and is subject to the provisions of Section 305 of the National Aeronautics and Space Act of 1958, Public Law 85-568 (72 Stat. 435; 42 U.S.C. 2457). --

Signed and sealed this 21st day of November 1972.

(SEAL)
Attest:

EDWARD M. FLETCHER, JR.
Attesting Officer

ROBERT GOTTSCHALK
Commissioner of Patents